(12) United States Patent
Kim

(10) Patent No.: US 10,688,989 B2
(45) Date of Patent: Jun. 23, 2020

(54) APPARATUS, SYSTEM, AND METHOD FOR VEHICLE COLLISION AVOIDANCE CONTROL

(71) Applicant: MANDO CORPORATION, Pyeongtaek-si, Gyeonggi-do (KR)

(72) Inventor: Jae Hwan Kim, Pyeongtaek-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/172,244

(22) Filed: Oct. 26, 2018

(65) Prior Publication Data
US 2019/0126915 A1    May 2, 2019

(30) Foreign Application Priority Data
Oct. 26, 2017  (KR) .................... 10-2017-0140512

(51) Int. Cl.
*B60W 30/09*     (2012.01)
*B60W 30/095*    (2012.01)
*G06K 9/00*      (2006.01)
*B60W 50/14*     (2020.01)

(52) U.S. Cl.
CPC ........ *B60W 30/09* (2013.01); *B60W 30/0956* (2013.01); *B60W 50/14* (2013.01); *G06K 9/00825* (2013.01); *B60W 2050/143* (2013.01); *B60W 2420/42* (2013.01); *B60W 2554/804* (2020.02)

(58) Field of Classification Search
CPC ........... B60W 30/09; B60W 2050/143; B60W 2420/42; B60W 2550/302; B60W 30/0956; B60W 50/14; G06K 9/00825
See application file for complete search history.

(56) References Cited

U.S. PATENT DOCUMENTS

| | | | | |
|---|---|---|---|---|
| 5,929,785 | A * | 7/1999 | Satonaka | B60K 31/0008 180/167 |
| 2012/0044066 | A1* | 2/2012 | Mauderer | B60T 7/22 340/479 |
| 2014/0379233 | A1* | 12/2014 | Chundrlik, Jr. | B60T 8/171 701/70 |
| 2018/0137380 | A1* | 5/2018 | Alrefai | G06K 9/00825 |

FOREIGN PATENT DOCUMENTS

| | | |
|---|---|---|
| JP | H10-109564 A | 4/1998 |
| JP | 2012-118795 A | 6/2012 |
| KR | 10-0240405 B1 | 10/1999 |
| KR | 10-2014-0129592 A | 11/2014 |

OTHER PUBLICATIONS

Office Action issued in Korean Patent Application No. 10-2017-0140512 dated Feb. 12, 2019.

* cited by examiner

*Primary Examiner* — Dale Moyer
(74) *Attorney, Agent, or Firm* — Morgan, Lewis & Bockius LLP

(57) ABSTRACT

Provided are an apparatus, system, and method for vehicle collision avoidance control. When a velocity of a vehicle is determined to be a control-involved velocity or higher, blinking of hazard lights of a preceding vehicle in front of the vehicle is recognized, and one or more of driver warning and deceleration control are performed on the basis of recognition of blinking of the hazard light of the preceding vehicle. Therefore, it is possible to recognize a probability of vehicle collision and avoid vehicle collision.

15 Claims, 6 Drawing Sheets

APPARATUS, SYSTEM, AND METHOD FOR VEHICLE COLLISION AVOIDANCE CONTROL

CROSS REFERENCE TO RELATED APPLICATION

This application claims priority from Korean Patent Application No. 10-2017-0140512, filed on Oct. 26, 2017, which is hereby incorporated by reference for all purposes as if fully set forth herein.

BACKGROUND OF THE INVENTION

1. Field of the Invention

The present disclosure relates to an apparatus, system, and method for vehicle collision avoidance control.

2. Description of the Prior Art

In the travel of a vehicle, the danger of collision continuously resides due to various factors, such as a driver's carelessness and another vehicle's invasion of a travel lane.

For this reason, various control technologies are under development to avoid vehicle collision.

According to existing control technologies for avoiding vehicle collision, only a change in the movement of a preceding vehicle is sensed to control movement of the corresponding vehicle accordingly.

However, when a preceding vehicle is likely to suddenly change its movement despite no change or a subtle change in the movement, it is not possible to immediately take a preventive measure against vehicle collision.

Therefore, immediate and rapid control is very required to avoid vehicle collision not only when movement of a preceding vehicle is changed but also when the preceding vehicle is likely to suddenly change its movement despite no change or a subtle change in the movement.

SUMMARY OF THE INVENTION

In this background, the present disclosure is to provide an apparaus, system, and method for vehicle collision avoidance control, the apparatus, system, and method being capable of avoiding vehicle collision by rapidly recognizing that an area in front of a vehicle which is traveling at high velocity is likely to be congested.

Also, the present disclosure is to provide an apparaus, system, and method for vehicle collision avoidance control, the apparaus, system, and method being capable of immediate and rapid control for avoiding vehicle collision not only when movement of a preceding vehicle is changed but also when the preceding vehicle is likely to suddenly change its movement despite no change or a subtle change in the movement.

Further, the present disclosure is to provide an apparaus, system, and method for vehicle collision avoidance control, the apparaus, system, and method enabling immediate and rapid control for avoiding vehicle collision when an area is suddenly congested while a vehicle is traveling at high velocity.

Moreover, the present disclosure is to provide an apparaus, system, and method for vehicle collision avoidance control, the apparaus, system, and method being capable of recognizing information which accurately indicates a probability that movement of a preceding vehicle will be suddenly changed despite no change or a subtle change in the movement and capable of using the information for vehicle collision avoidance control.

An embodiment provides an apparatus for vehicle collision avoidance control, the apparatus processing image data captured by an image sensor, which is disposed in a vehicle, has a field of view out of the vehicle, and captures image data, recognizing blinking of hazard lights of a preceding vehicle on the basis of front image data captured by the image sensor when the velocity of the vehicle is a control-involved velocity or higher, and performing one or more of driver warning and deceleration control accordingly.

An embodiment provides a system for vehicle collision avoidance control, the system including: a sensing module including at least an image sensor, which is disposed in a vehicle, has a field of view out of the vehicle, and captures image data, and configured to sense an object nearby the vehicle; and a controller including a processor configured to process the image data captured by the image sensor, wherein the controller recognizes blinking of hazard lights of a preceding vehicle of the vehicle at least partially based on processing of the image data captured by the image sensor and performs one or more of driver warning and deceleration control accordingly.

The controller may include an apparatus for vehicle collision avoidance control, and the apparatus for vehicle collision avoidance control may include: a control-starting module configured to determine whether a velocity of the vehicle is a control-involved velocity or higher; a hazard-light blinking recognition module configured to recognize blinking of the hazard lights of the preceding vehicle in front of the vehicle when the velocity of the vehicle is determined to be the control-involved velocity or higher; and a control processing module configured to perform one or more of driver warning and deceleration control when blinking of the hazard lights of the preceding vehicle is recognized.

At a point in time when blinking of the hazard lights of the preceding vehicle is recognized, the preceding vehicle may be traveling at a certain velocity or lower or have stopped in a lane in which the vehicle is traveling or an adjacent lane of the lane.

The control processing module may issue a driver warning when blinking of the hazard lights of the preceding vehicle is recognized, determine whether the vehicle is currently in danger of collision with the preceding vehicle, and perform deceleration control when it is determined that the vehicle is currently in danger of collision with the preceding vehicle.

Another embodiment provides a system for vehicle collision avoidance control, the system including a camera configured to acquire a front video, and a vehicle collision avoidance control apparatus configured to perform one or more of driver warning and deceleration control in response to blinking of hazard lights of a preceding vehicle of a vehicle on the basis of the front video when a velocity of the vehicle is a control-involved velocity or higher.

Another embodiment provides a method for vehicle collision avoidance control, the method including: a first operation of determining whether a velocity of a vehicle is a control-involved velocity or higher; a second operation of processing front image data captured by an image sensor, which is disposed in the vehicle, has a field of view out of the vehicle, and captures image data, and recognizing blinking of hazard lights of a preceding vehicle of the vehicle when the velocity of the vehicle is determined to be the control-involved velocity or higher; and a third operation of performing one or more of driver warning and deceleration control when blinking of the hazard lights of the preceding vehicle is recognized.

At a point in time when blinking of the hazard lights of the preceding vehicle is recognized, the preceding vehicle may be traveling at a certain velocity or lower or have stopped in a lane in which the vehicle is traveling or an adjacent lane of the lane.

The third operation in the method may include: issuing a driver warning when blinking of the hazard lights of the preceding vehicle is recognized; determining whether the vehicle is currently in danger of collision with the preceding vehicle; and performing deceleration control when it is determined that the vehicle is currently in danger of collision with the preceding vehicle.

Meanwhile, the third operation may include issuing a rear warning for notifying a front situation of the vehicle to a following vehicle of the vehicle.

Another embodiment provides a system for vehicle collision avoidance control, the system including: a sensing module configured to include one or more of an image sensor which is disposed in a vehicle, has a field of view out of the vehicle, and captures image data and a non-image sensor which is disposed in the vehicle and captures sensing data to sense one of objects nearby the vehicle; a vehicle movement control module configured to control one or more of a velocity, a braking force, and a steering angle of the vehicle; a warning module configured to output a warning signal to a driver; and a domain controller configured to process one or more of the image data captured by the image sensor and the sensing data captured by the non-image sensor and control the warning module or the vehicle movement control module, wherein the domain controller recognizes blinking of hazard lights of a preceding vehicle of the vehicle at least partially based on processing of the image data captured by the image sensor and performs one or more of driver warning through the warning module and deceleration control through the vehicle movement control module.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
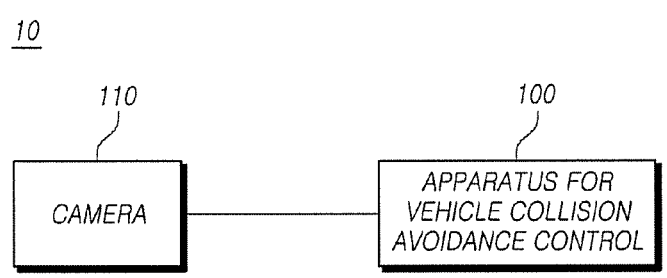
FIG. 1 is a block diagram of a system for vehicle collision avoidance control according to an embodiment of the present disclosure.

Hereinafter, embodiments of the present disclosure will be described in detail with reference to the accompanying drawings. In adding reference numerals to elements in each drawing, the same elements will be designated by the same reference numerals if possible, although they may be shown in different drawings. Further, in the following description of the present disclosure, a detailed description of known functions or configurations incorporated herein will be omitted when it is determined that the description may make the subject matter of the present disclosure rather unclear.

In describing elements of embodiments of the present disclosure, terms such as "first," "second," "A," "B," "(a)," and "(b)" may be used. Such terms are used only to distinguish an element from another element, but do not limit the substance, sequence, order, number, or the like of elements. It should be noted that when one component is described as being "connected," "coupled," or "joined" to another component, still another component may be "interposed" between the two components or the two components may be "connected," "coupled," or "joined" to each other via the other component, even though the component may be directly "connected," "coupled," or "joined" to the other component.

Figure 2:
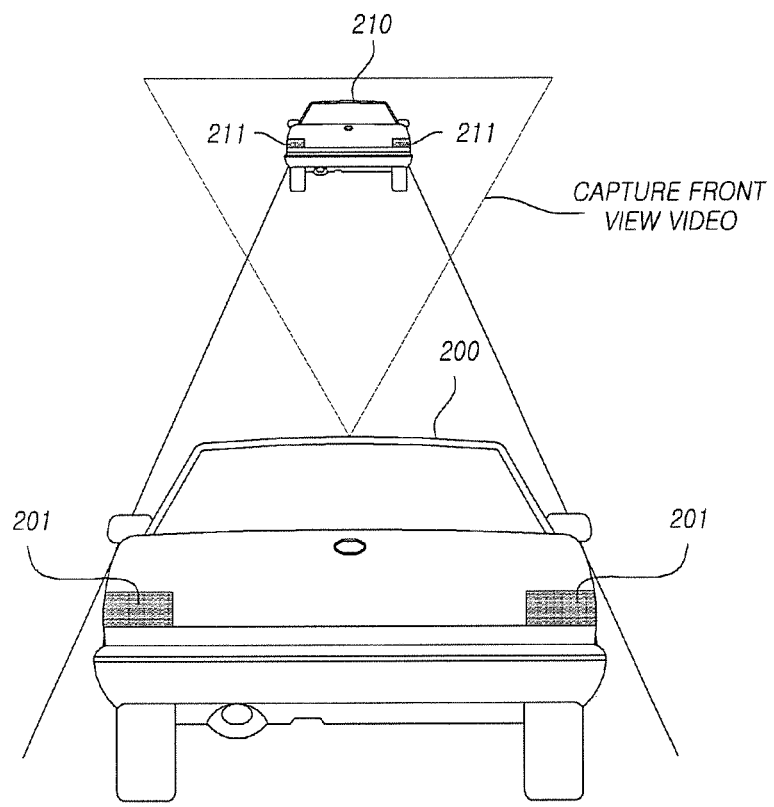
FIG. 2 shows recognition of blinking of hazard lights of a preceding vehicle for vehicle collision avoidance control according to an embodiment of the present disclosure.

FIG. 1 is a block diagram of a system 10 for vehicle collision avoidance control according to an embodiment of the present disclosure. FIG. 2 shows recognition of blinking of hazard lights of a preceding vehicle 210 for vehicle collision avoidance control according to an embodiment of the present disclosure.

Referring to FIG. 1, the system 10 for vehicle collision avoidance control installed in a vehicle 200 may include a camera 110 which acquires a front video of the vehicle 200, an apparatus 100 for vehicle collision avoidance control (referred to as "vehicle collision avoidance control apparatus" below) which performs vehicle collision avoidance control including one or more of driver warning and deceleration control in response to blinking of hazard lights 211 of the preceding vehicle 210 of the vehicle 200 based on the front video when a velocity of the vehicle 200 is a control-involved velocity or higher, and the like.

Here, the vehicle 200 in which the system 10 for vehicle collision avoidance control according to an embodiment of the present disclosure is installed is also referred to as the "corresponding vehicle."

In addition to a vehicle image sensor such as the camera 110, the system 10 for vehicle collision avoidance control according to an embodiment of the present disclosure may include a non-image sensor such as a radar sensor and an ultrasonic sensor. The image sensor and/or the non-image sensor may be referred to as a sensing module.

The system 10 for vehicle collision avoidance control according to an embodiment of the present disclosure may include the vehicle collision avoidance control apparatus 100, and the vehicle collision avoidance control apparatus 100 may be implemented as a controller, a domain control unit (DCU), or a domain controller which performs functions to be described below. The sensing module according to an embodiment of the present disclosure may include a non-image sensor and the like which is disposed in a vehicle and captures sensing data to sense one of objects nearby the vehicle in addition to an image sensor or the camera 110 which is disposed in the vehicle, has a field of view out of the vehicle, and captures image data.

A vehicle camera applied to an embodiment of the present disclosure may be indicated by other terms such as an image system, a vision system, an image sensor, or the like. The vehicle camera may include a front camera having a field of view to the front of a vehicle, a rear camera having a field of view to the rear of the vehicle, a posterolateral camera having a field of view to a lateral or a posterolateral direction of the vehicle, and the like. In some cases, the vehicle camera may selectively include one or more of such cameras of several directions.

Such a camera functions to capture image data of the vicinity of a vehicle and transfer the image data to a processor or the controller, and a vision system or an image sensor according to an embodiment of the present disclosure may additionally include an electronic control unit (ECU) or an image processor which functions to process the captured image data and display the image data on a display and the like.

Also, a vision system, an image sensor, or the like according an embodiment of the present disclosure may use an appropriate data link or communication link, such as a vehicle network bus, for data transmission or signal communication from a camera to an image processor.

Further, a vehicle to which an embodiment of the present disclosure is applied may additionally include a non-image sensor such as a radar sensor or an ultrasonic sensor.

A radar sensor or a radar system used as a non-image sensor in the present disclosure may include at least one radar sensor unit, for example, one or more of a front radar sensor installed on a front side of a vehicle, a rear radar sensor installed on a rear side of the vehicle, and a lateral or posterolateral radar sensor installed on each lateral side of the vehicle. Such a radar sensor or radar system may process data by analyzing a transmission signal and a reception signal and detect information on an object accordingly, and may include an ECU or a processor for the purpose. For data transmission or signal communication from the radar sensor to the ECU, a communication link, such as an appropriate vehicle network bus, may be used.

Such a radar sensor includes one or more transmitting antennas which transmit a radar signal and one or more receiving antennas which receive a signal reflected by an object.

Meanwhile, a radar sensor according to an embodiment of the present disclosure may employ a multi-dimensional antenna arrangement and a multiple-input multiple-output (MIMO) signal transmission and reception method to form a virtual antenna aperture larger than an actual antenna aperture.

For example, a two-dimensional (2D) antenna array is used to achieve angular precision and resolutions horizontally and vertically. When a 2D radar antenna array is used, signals are transmitted and received through (time-multiplexed) two separate scanning operations, that is, horizontal and vertical scanning operations, and MIMO may be used separately from horizontal and vertical scanning (time-multiplexing) of the 2D radar antenna.

More specifically, the radar sensor according to an embodiment of the present disclosure may employ a 2D antenna array composed of a transmitting antenna unit including a total of 12 transmitting antennas Tx and a receiving antenna unit including 16 receiving antennas Rx, thus having an arrangement of a total of 192 virtual receiving antennas.

In this case, the transmitting antenna unit may have three transmitting antenna groups each including four transmitting antennas. A first transmitting antenna group may be vertically spaced apart from a second transmitting antenna group by a certain distance, and the first or second transmitting antenna group may be horizontally spaced apart from a third transmitting antenna group by a certain distance D.

Also, the receiving antenna unit may have four receiving antenna groups each including four receiving antennas. The respective receiving antenna groups may be disposed to be vertically spaced apart and may be disposed between the first transmitting antenna group and the third transmitting antenna group which are horizontally spaced apart.

According to another embodiment of the present disclosure, antennas of a radar sensor may be disposed in a 2D antenna array. As an example, antenna patches may be arranged in a rhombic lattice so that unnecessary side lobes may be reduced.

Otherwise, a 2D antenna arrangement may include a V-shaped antenna array in which multiple radiation patches are disposed in a V shape and more specifically, may include two V-shaped antenna arrays. In this case, a single feed is made at the apex of each V-shaped antenna array.

Otherwise, a 2D antenna arrangement may include an X-shaped antenna array in which multiple radiation patches are disposed in a X shape and more specifically, may include two X-shaped antenna arrays. In this case, a single feed is made at the center of each X-shaped antenna array.

The radar sensor according to an embodiment of the present disclosure may use a MIMO antenna system to implement sensing accuracy and resolutions horizontally and vertically.

More specifically, in the MIMO system, respective transmitting antennas may transmit signals which have independent waveforms distinguished from each other. In other words, each transmitting antenna transmits a signal having an independent waveform distinguished from waveforms of other transmitting antennas, and each receiving antenna may determine which transmitting antenna has transmitted a signal reflected by an object due to different waveforms of the signals.

The radar sensor according to an embodiment of the present disclosure may include a radar housing which accommodates a substrate and circuit including transmitting and receiving antennas and a radome which provides the appearance of the radar housing. In this case, the radome may be made of a material for reducing attenuation of radar signals transmitted and received and may constitute front and rear bumpers or grilles of a vehicle, a lateral body of the vehicle, or an external surface of a vehicle component.

In other words, the radome of the radar sensor may be disposed in a grille, a bumper, a body, or the like of a vehicle or may be disposed as one of parts, such as the grille or the bumper of the vehicle or a part of the vehicle body, constituting an external surface of the vehicle, thereby providing convenience in installing the radar sensor as well as a good appearance of the vehicle.

Also, a vehicle kinematic sensor disposed in a vehicle may be further included to sense information related to travel of the vehicle, and a speed sensor and the like may be used as the vehicle kinematic sensor.

As described above, the system 10 for vehicle collision avoidance control according to an embodiment of the present disclosure performs vehicle collision avoidance control in response to blinking of the hazard lights 211 of the preceding vehicle 210 so that the vehicle 200 does not collide with the preceding vehicle 210.

As an example, the system 10 for vehicle collision avoidance control according to an embodiment of the present disclosure may perform vehicle collision avoidance control on the basis of recognition of blinking of hazard lights when the vehicle 200 travels at high velocity.

The preceding vehicle 210 may be traveling at a certain velocity or lower or have stopped in a lane in which the vehicle 200 is traveling or an adjacent lane of the lane at a point in time when blinking of the hazard lights 211 of the preceding vehicle 210 is recognized so that the system 10 for vehicle collision avoidance control according to an embodiment of the present disclosure may perform vehicle collision avoidance control on the basis of recognition of blinking of hazard lights.

In other words, the system 10 for vehicle collision avoidance control according to an embodiment of the present disclosure may be implemented as a part of a traffic jam assist function for assisting driving in a congested area of a highway or a local road.

Specifically, whether the vicinity of the vehicle 200 is congested is determined using a sensing signal of one or more the image sensor and the non-image sensor included in the sensing module, an output signal of a navigation device and the like for detecting traffic conditions, and a signal received from an external source through vehicle-to-everything (V2X) communication and the like.

When it is determined that the vicinity of the vehicle 200 is congested, the vehicle collision avoidance control apparatus 100 or the controller of the system 10 for vehicle collision avoidance control may recognize blinking of the hazard lights 211 of the preceding vehicle 210 by processing a sensing signal of the image sensor of the sensing module and perform vehicle collision avoidance control for avoiding collision with the preceding vehicle 210.

Here, the vehicle collision avoidance control may be warning to a driver of the vehicle 200, velocity control (deceleration) of the vehicle 200, rear warning to a following vehicle, and the like.

In other words, when blinking of the hazard lights 211 of the preceding vehicle 210 traveling at low velocity or having stopped is recognized while the vehicle 200 is traveling at high velocity, the system 10 for vehicle collision avoidance control according to an embodiment of the present disclosure may perform vehicle collision avoidance control for avoiding collision with the preceding vehicle 210.

For example, when an area in front of the vehicle 200 is congested while the vehicle 200 is traveling on a highway, the system 10 for vehicle collision avoidance control according to an embodiment of the present disclosure may perform vehicle collision avoidance control for avoiding collision with the preceding vehicle 210 which is in or has just entered the congested area of the highway.

When blinking of the hazard lights 211 of the preceding vehicle 210 is recognized, the vehicle collision avoidance control apparatus 100 in the system 10 for vehicle collision avoidance control according to an embodiment of the present disclosure issues a driver warning for notifying a current situation (i.e., a situation in which the hazard lights 211 of the preceding vehicle 210 are blinking or a congested area is in front of the vehicle 200) to the driver of the vehicle 200 and determines whether the vehicle 200 is currently in danger of collision with the preceding vehicle 210.

When it is determined that the vehicle 200 is currently in danger of collision, the system 10 for vehicle collision avoidance control according to an embodiment of the present disclosure may perform deceleration control.

For example, the vehicle collision avoidance control apparatus 100 according to an embodiment of the present disclosure compares a current braking amount of the vehicle 200 and a braking amount (a threshold value) required for avoiding collision and determines that the vehicle 200 is currently in danger of collision when the current braking amount of the vehicle 200 is less than the braking amount (the threshold value) required for avoiding collision.

Specifically, the vehicle collision avoidance control apparatus 100 or the controller calculates a distance and a relative velocity with respect to the preceding vehicle 210 on the basis of a sensing signal of the sensing module and calculates a time to collision (TTC) with the preceding vehicle 210 on the basis of the distance and the relative velocity.

Whether the vehicle 200 is in danger of collision may be determined using the calculated TTC and the braking performance of the corresponding vehicle 200, and a velocity or steering of the corresponding vehicle 200 may be controlled accordingly.

For example, when it is possible to avoid collision with the preceding vehicle 210 by applying a maximum braking force to the corresponding vehicle 200, deceleration control or brake control is performed on the corresponding vehicle 200.

On the other hand, when collision with the preceding vehicle 210 is expected despite the maximum braking force applied to the corresponding vehicle 200, it is possible to perform autonomous emergency steering for moving the vehicle 200 laterally by giving forced steering force in a safe direction after recognizing an obstacle existing behind in the left or right lane of the vehicle 200 on the basis of a sensing signal of the non-image sensor and the like. Also, when blinking of the hazard lights 211 of the preceding vehicle 210 is recognized, the vehicle collision avoidance control apparatus 100 according to an embodiment of the present disclosure may issue a rear warning for notifying the current situation of the vehicle 200, that is, the front situation of the vehicle 200, to a following vehicle of the vehicle 200.

The rear warning may be, for example, blinking of hazard lights 201 of the vehicle 200, sounding of an alarm, transmission of a warning signal to the following vehicle through V2X communication, and the like.

Figure 3:
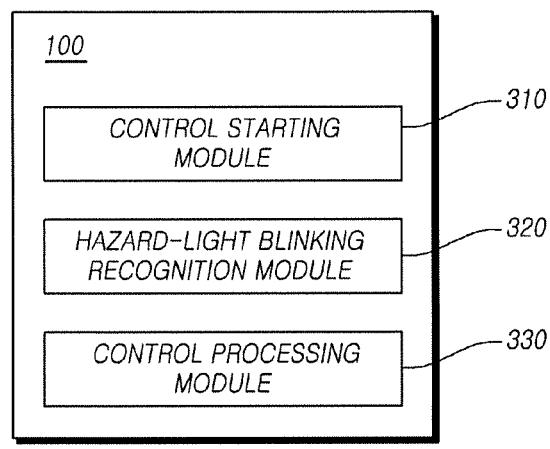
FIG. 3 is a block diagram of an apparatus for vehicle collision avoidance control according to an embodiment of the present disclosure.
Figure 4:
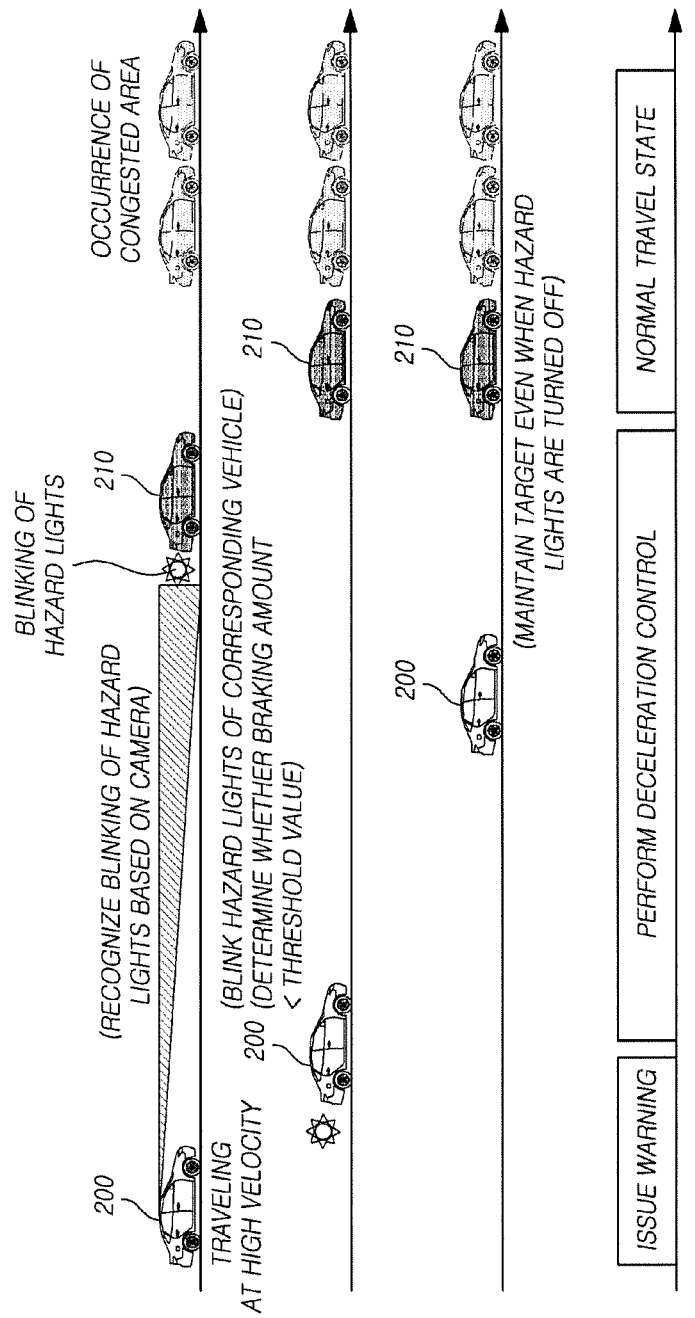
FIG. 4 shows an example of vehicle collision avoidance control according to an embodiment of the present disclosure.

FIG. 3 is a block diagram of the vehicle collision avoidance control apparatus 100 according to an embodiment of the present disclosure, and FIG. 4 shows an example of vehicle collision avoidance control according to an embodiment of the present disclosure.

Referring to FIG. 3, the vehicle collision avoidance control apparatus 100 according to an embodiment of the present disclosure may include a control starting module 310 which determines whether the velocity of the vehicle 200 is a control-involved velocity or higher, a hazard-light blinking recognition module 320 which recognizes blinking of the hazard lights 211 of the preceding vehicle 210 in front of the vehicle 200 when it is determined that the velocity of the vehicle 200 is the control-involved velocity or higher, and a control processing module 330 which performs one or more of driver warning and deceleration control when blinking of the hazard lights 211 of the preceding vehicle 210 is recognized.

At a point in time when blinking of the hazard lights 211 of the preceding vehicle 210 is recognized, the preceding vehicle 210 may be traveling at a certain velocity or lower or have stopped in the lane in which the vehicle 200 is traveling or an adjacent lane of the lane. When blinking of the hazard lights 211 of the preceding vehicle 210 is recognized, the control processing module 330 may issue a driver warning for notifying the current situation to the driver of the vehicle 200 and determine whether the vehicle 200 is currently in danger of collision with the preceding vehicle 210. When the vehicle 200 is determined to be currently in danger of collision with the preceding vehicle 210, the control processing module 330 may perform vehicle collision avoidance control corresponding to deceleration control.

When a braking amount of the vehicle 200 is currently smaller than the threshold value, the control processing module 330 may determine that the vehicle 200 is currently in danger of collision with the preceding vehicle 210.

Here, the current braking amount of the vehicle 200 may be a braking amount input by the driver's manipulation.

The braking amount (the threshold value) required for avoiding collision may be calculated, for example, by the vehicle collision avoidance control apparatus 100 on the basis of a distance between the vehicle 200 and the preceding vehicle 210, a relative velocity between the vehicle 200 and the preceding vehicle 210, and the like.

The distance between the vehicle 200 and the preceding vehicle 210 may be obtained by a sensor such as a radar installed in the vehicle 200.

The relative velocity between the vehicle 200 and the preceding vehicle 210 may be obtained by a sensor such as a radar, a vehicle velocity sensor, and/or the like installed in the vehicle 200.

When blinking of the hazard lights 211 of the preceding vehicle 210 is recognized, the control processing module 330 may perform vehicle collision avoidance control including a rear warning for notifying the front situation of the vehicle 200 to the following vehicle of the vehicle 200.

To notify the current situation (blinking of the hazard lights 211 of the preceding vehicle 210, a congested area in front of the vehicle 200, the probability of vehicle collision, or the like) to a driver of the following vehicle behind the vehicle 200, the rear warning may include one or more of blinking of hazard lights, that is, to blink the hazard lights 201 of the vehicle 200, alarm sounding, that is, to sound the alarm of the vehicle 200, and the like.

Also, the rear warning may include transmission of a signal including information on the current situation (blinking of the hazard lights 211 of the preceding vehicle 210, a congested area in front of the vehicle 200, the probability of vehicle collision, or the like) to the driver of the following vehicle behind the vehicle 200 through V2X communication and the like.

To this end, the vehicle 200 may additionally include a V2X communicator, and the V2X communicator supports vehicle-to-vehicle communication or V2X communication, which is vehicle-to-infrastructure communication, and may receive traffic information from other nearby vehicles or nearby infrastructure equipment.

A communication method of the V2X communicator may be wireless access in vehicular environment (WAVE) communication which uses a communication frequency of 5.9 GHz in the form of a multi-hop network, but is not limited thereto.

The V2X communicator functions to generate a rear warning signal on the basis of recognition information of blinking of the hazard lights 211 of the preceding vehicle 210 received from the control processing module 330 and wirelessly transmit the rear warning signal.

When blinking of the hazard lights 211 of the preceding vehicle 210 is recognized and then is stopped, the control processing module 330 may maintain the preceding vehicle as a control target and perform deceleration control of the vehicle 200.

Specifically, the system 10 for vehicle collision avoidance control according to an embodiment of the present disclosure may include an adaptive cruise control (ACC) module which follows a target ahead. When blinking of the hazard lights 211 of the preceding vehicle 210 is recognized and then the blinking is not recognized any more, the control processing module 330 may activate or control the ACC module to set the preceding vehicle 210 as a target and follow the preceding vehicle 210.

In other words, the control processing module 330 issues a driver warning or performs vehicle deceleration control when blinking of the hazard lights 211 of the preceding vehicle 210 is recognized, and performs ACC targeting the preceding vehicle 210 when blinking of the hazard lights 211 is not recognized thereafter. In this way, it is possible to provide greater convenience to the driver while avoiding collision in a congested area.

Meanwhile, when blinking of the hazard lights 211 of the preceding vehicle 210 is not recognized, the control processing module 330 may perform deceleration control on the basis of a TTC with the preceding vehicle 210.

As an example, the control processing module 330 may calculate a TTC between the vehicle 200 and the preceding vehicle 210 and perform deceleration control when the calculated TTC is smaller than a threshold value. Here, the threshold value may be a braking time for avoiding collision.

The threshold value which may correspond to the braking time for avoiding collision may be calculated, for example, by the vehicle collision avoidance control apparatus 100 on the basis of one or more of the distance between the vehicle 200 and the preceding vehicle 210, the relative velocity between the vehicle 200 and the preceding vehicle 210, the braking performance of the vehicle 200, and the like.

Meanwhile, the hazard-light blinking recognition module 320 may recognize blinking of the hazard lights 211 of the preceding vehicle 210 by analyzing a front video acquired by the camera 110 or the image sensor when a region having a certain level of luminance (brightness) or higher exists in the front video, a region whose luminance is changed at certain intervals exists in the front video, or a region whose luminance is changed a certain number of times or more exists in the front video.

The hazard-light blinking recognition module 320 may exist out of the camera 110 or the image sensor or exist as an internal module of the camera 110 or the image sensor.

As described above, the vehicle 200 and the preceding vehicle 210 may be on a highway.

The vehicle collision avoidance control apparatus 100 installed in the vehicle 200 traveling at high velocity on a highway may recognize a congested highway area in front of the vehicle 200 through blinking of the hazard lights 211 of the preceding vehicle 210.

Meanwhile, the vehicle collision avoidance control apparatus 100 installed in the vehicle 200 may indirectly detect that the vehicle 200 is on a highway through the velocity of the vehicle 200 and start collision avoidance control accordingly on the basis of blinking of hazard lights.

For example, the vehicle collision avoidance control apparatus 100 may indirectly detect that the vehicle 200 is on a highway by determining whether the velocity of the vehicle 200 is the control-involved velocity or higher. Here, the control-involved velocity may be a vehicle velocity value set for highways.

Also, the vehicle collision avoidance control apparatus 100 installed in the vehicle 200 may receive highway entry information, directly detect that the vehicle 200 is on a highway, and start collision avoidance control.

The vehicle collision avoidance control apparatus 100 may receive highway entry information from a highway pass terminal, a navigation terminal, a vehicle device, or the like installed in the vehicle 200.

Meanwhile, the control starting module 310, the hazard-light blinking recognition module 320, and the control processing module 330 included in the vehicle collision avoidance control apparatus 100 may be included in one electronic control device.

The control starting module 310, the hazard-light blinking recognition module 320, and the control processing module 330 included in the vehicle collision avoidance control apparatus 100 may be integrated and function as one controller. The controller may include a processor for processing one or more of image data captured by a camera or an image sensor included in the sensing module and sensing data captured by a non-image sensor.

Also, the controller may recognize blinking of hazard lights of a preceding vehicle on the basis of a sensing signal of the sensing module and then perform vehicle collision avoidance control. The vehicle collision avoidance control may be one or more of warning to the driver of the corresponding vehicle 200, velocity control (deceleration) of the corresponding vehicle 200, and rear warning to a following vehicle.

The controller may be implemented as a DCU or a domain controller which integrally has a function of receiving and processing information of several vehicle sensors or relaying sensor signals, a function of controlling movement of a vehicle according to an embodiment of the present disclosure by generating and transmitting a vehicle collision avoidance control signal to a vehicle brake control module or a steering control module, and the like.

The DCU may recognize blinking of hazard lights of a preceding vehicle at least partially on the basis of a function of processing one or more of image data captured by the image sensor and sensing data captured by the non-image sensor and processing of the image data captured by the image sensor and may perform one or more of warning to the driver of the corresponding vehicle 200, velocity control (deceleration) of the corresponding vehicle 200, and rear warning to a following vehicle.

Unlike this, the control starting module 310, the hazard-light blinking recognition module 320, and the control processing module 330 included in the vehicle collision avoidance control apparatus 100 may be implemented in two or more electronic devices in a distributed manner.

For example, the hazard-light blinking recognition module 320 may be included in the camera 110 or an electronic device connected to the camera 110, and the control starting module 310 and the control processing module 330 may be included in an electronic control device connected to the hazard-light blinking recognition module 320.

The aforementioned electronic control device may be an ECU.

Meanwhile, the above-described vehicle collision avoidance control apparatus 100 or the (domain) controller according to an embodiment of the present disclosure and the control starting module 310, the hazard-light blinking recognition module 320, the control processing module 330, and the like which are components thereof may be implemented as some modules constituting the system 10 for vehicle collision avoidance control according to an embodiment of the present disclosure or some modules of an ECU for the system 10.

Modules or the ECU constituting the system 10 for vehicle collision avoidance control may include a processor, a storage device such as a memory, a computer program for performing a specific function, and the like, and the control starting module 310, the hazard-light blinking recognition module 320, the control processing module 330, etc. described above may be implemented as software modules for performing respective unique functions thereof.

Since such software can be easily coded by those of ordinary skill in the art on the basis of descriptions of this specification, the description of a detailed form of software will be omitted.

Figure 5:
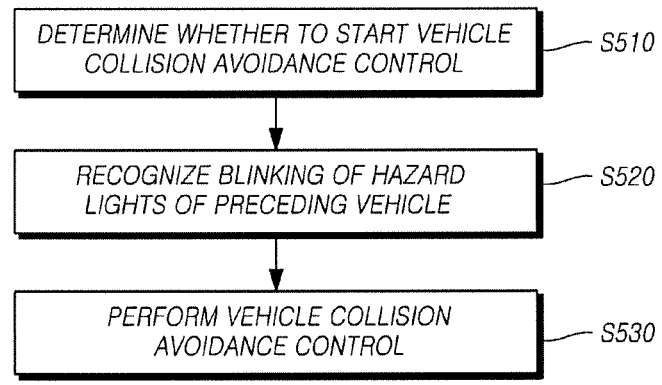
FIG. 5 is a flowchart illustrating a method for vehicle collision avoidance control according to an embodiment of the present disclosure.

FIG. 5 is a flowchart illustrating a method for vehicle collision avoidance control according to an embodiment of the present disclosure.

Referring to FIG. 5, a method for vehicle collision avoidance control by the vehicle collision avoidance control apparatus 100 according to an embodiment of the present disclosure may include an operation of determining whether to start vehicle collision avoidance control (S510), an operation of recognizing blinking of the hazard lights 211 of the preceding vehicle 210 (S520), an operation of performing vehicle collision avoidance control (S530), and the like.

In operation S510, the vehicle collision avoidance control apparatus 100 may determine whether a velocity of the vehicle 200 is a control-involved velocity or higher.

In operation S520, when the velocity of the vehicle 200 is determined to be the control-involved velocity or higher, the vehicle collision avoidance control apparatus 100 may recognize blinking of the hazard lights 211 of the preceding vehicle 210 in front of the vehicle 200.

In operation S530, when blinking of the hazard lights 211 of the preceding vehicle 210 is recognized, the vehicle collision avoidance control apparatus 100 may perform vehicle collision avoidance control including one or more of driver warning and deceleration control.

At the point in time when blinking of the hazard lights 211 of the preceding vehicle 210 is recognized, the preceding vehicle 210 may be traveling at a certain velocity or lower or have stopped in a lane in which the vehicle 200 is traveling or an adjacent lane of the lane.

Figure 6:
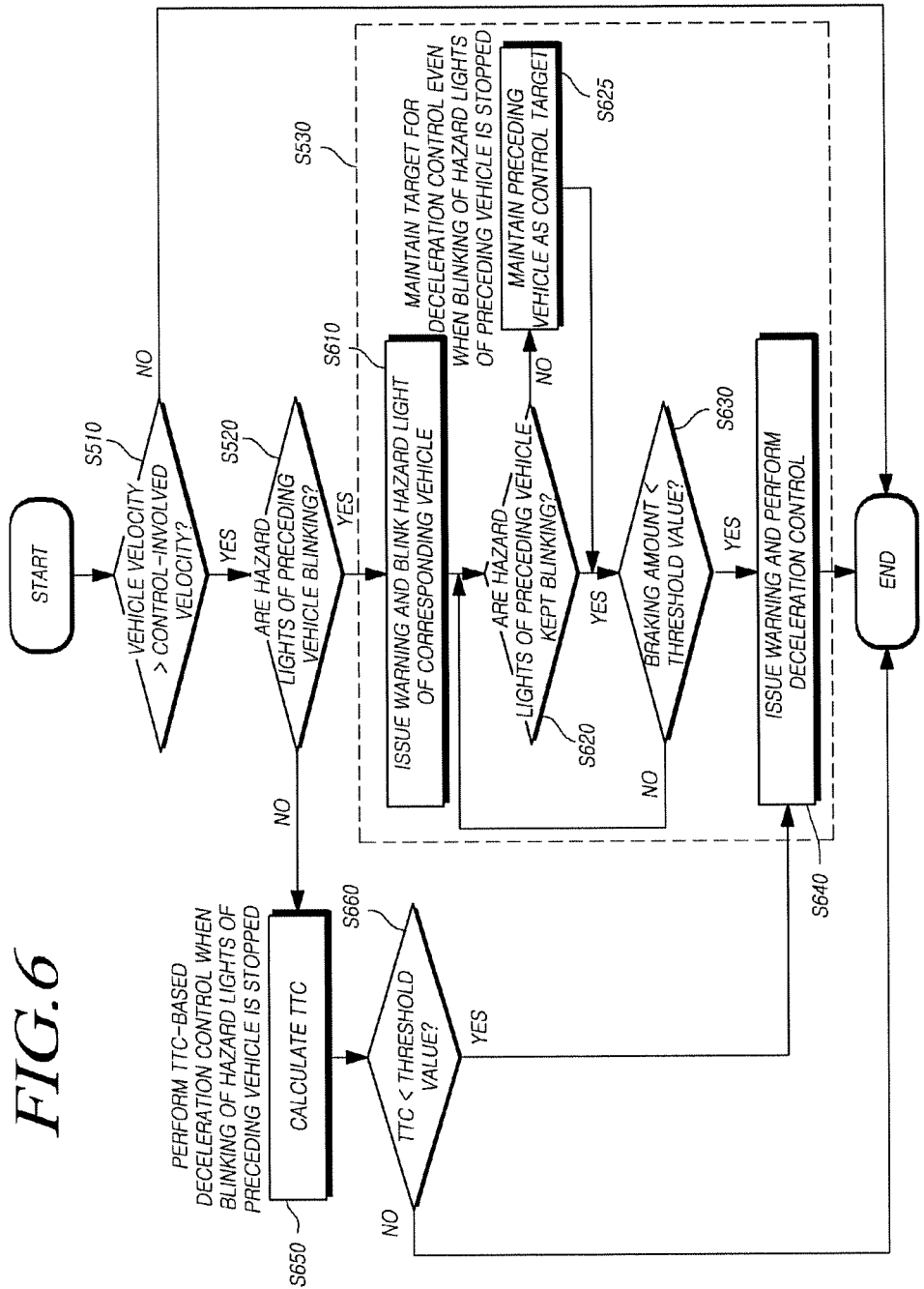
FIG. 6 is a detailed flowchart illustrating a method for vehicle collision avoidance control according to an embodiment of the present disclosure.

FIG. 6 is a detailed flowchart illustrating a method for vehicle collision avoidance control according to an embodiment of the present disclosure.

FIG. 6 is a flowchart illustrating operation S530 in detail.

Operation S530 may include an operation of issuing a driver warning when blinking of the hazard lights 211 of the preceding vehicle 210 is recognized (S610), an operation of determining whether the vehicle 200 is currently in danger of collision with the preceding vehicle 210 (S630), an operation of controlling deceleration when the vehicle 200 is determined to be currently in danger of collision with the preceding vehicle 210 (S640), and the like.

Meanwhile, after operation S610, the vehicle collision avoidance control apparatus 100 may perform an operation of determining whether blinking of the hazard lights 211 of the preceding vehicle 210 recognized in operation S610 is continuously maintained, and when it is determined in operation S620 that blinking of the hazard lights 211 of the preceding vehicle 210 is continuously maintained, operation S630 may be performed.

On the other hand, when it is determined in operation S620 that blinking of the hazard lights 211 of the preceding vehicle 210 is not continuously maintained, that is, when blinking of the hazard lights 211 of the preceding vehicle 210 is stopped, the vehicle collision avoidance control apparatus 100 may maintain the preceding vehicle 210 as a control target (S625) and perform deceleration control of the vehicle 200 with respect to the preceding vehicle 210 which is the control target.

Meanwhile, in operation S630, the vehicle collision avoidance control apparatus 100 may determine whether a braking amount is less than a threshold value and determine that the vehicle 200 is currently in danger of collision with the preceding vehicle 210 when the braking amount is less than the threshold value (e.g., a brake threshold value for avoiding vehicle collision).

Here, a braking amount less than the threshold value may denote that the vehicle 200 may collide with the preceding vehicle 210 due to a lack of the braking amount.

When it is determined in operation S630 that the braking amount is less than the threshold value, operation S640 may be performed, and when it is determined in operation S630 that the braking amount is the threshold value or more, operation S620 may be performed again.

Here, a braking amount greater than or equal to the threshold value may denote that the vehicle 200 is unlikely to collide with the preceding vehicle 210 due to the sufficient braking amount of the vehicle 200 even when blinking of the hazard lights 211 of the preceding vehicle 210 is recognized.

In operation S530, the vehicle collision avoidance control apparatus 100 may issue a rear warning for notifying the front situation of the vehicle 200 to a following vehicle of the vehicle 200.

For example, in operation S610, the vehicle collision avoidance control apparatus 100 may issue not only a driver warning but also a rear warning of blinking the hazard lights 201 of the corresponding vehicle 200.

Also, in operation S610 and/or S640, the vehicle collision avoidance control apparatus 100 may sound an alarm of the vehicle 200 to notify the current situation (blinking of the hazard lights of the preceding vehicle, a congested area in front of the vehicle 200, the probability of vehicle collision, or the like) to a driver of the following vehicle behind the vehicle 200.

Meanwhile, even when vehicle collision avoidance control is started on the basis of blinking of hazard lights because it is determined in operation S510 that the velocity of the vehicle 200 is the control-involved velocity or higher, blinking of the hazard lights 211 of the preceding vehicle 210 may not be recognized in operation S520. In this case, a TTC with the preceding vehicle 210 is calculated (S650), and it is determined whether the calculated TTC is smaller than a threshold value (e.g., a threshold value of braking time) (S660). When the calculated TTC is smaller than the threshold value, deceleration may be controlled (S640).

According to an embodiment of the present disclosure, it is possible to use a domain controller which functions as a DCU of a vehicle.

In other words, a system for vehicle collision avoidance control according to an embodiment of the present disclosure may include a sensing module including one or more of an image sensor which is disposed in a vehicle, has a field of view out of the vehicle, and captures image data and a non-image sensor which is disposed in the vehicle and captures sensing data to sense one of objects nearby the vehicle, a vehicle movement control module which controls one or more of a velocity, a braking force, and a steering angle of the vehicle, a warning module which outputs a warning signal to a driver, and a domain controller which processes one or more of the image data captured by the image sensor and the sensing data captured by the non-image sensor and controls the warning module or the vehicle movement control module.

Here, the domain controller may recognize blinking of hazard lights of a preceding vehicle of the vehicle at least partially based on processing of the image data captured by the image sensor and perform one or more of driver warning through the warning module and deceleration control through the vehicle movement control module.

The vehicle movement control module is a device for controlling movement of the vehicle by controlling one or more of the engine, the brake system, and the steering system of the vehicle. The vehicle movement control module may include a lane keeping assist (LKA) module, a lane changing assist (LCA) module, an ACC module, a collision avoidance control module, an autonomous emergency braking (AEB) module, etc. constituting a driver assistance system (DAS), but is not limited thereto.

Meanwhile, it is possible to use an AEB module or an ACC module for deceleration control according to an embodiment of the present disclosure. In general, an AEB module operates at a high deceleration rate (braking amount) of about 1G or less, and an ACC module operates at a low deceleration rate (a braking amount) of about 0.35G or less.

Therefore, for deceleration control in response to blinking of hazard lights of a preceding vehicle according to an embodiment of the present disclosure, one of the AEB module and the ACC module may be controlled according to a required deceleration rate.

Alternatively, deceleration control may be performed using one of the AEB module and the ACC module having a higher maximum deceleration rate.

According to the above-described embodiments, an apparaus, system, and method for vehicle collision avoidance control can avoid vehicle collision by rapidly recognizing that an area in front of a vehicle which is traveling at high velocity is likely to be congested.

According to the embodiments of the present disclosure, an apparaus, system, and method for vehicle collision avoidance control can perform immediate and rapid control for avoiding vehicle collision not only when movement of a preceding vehicle is changed but also when the preceding vehicle is likely to suddenly change its movement despite no change or a subtle change in the movement.

According to the embodiments of the present disclosure, an apparaus, system, and method for vehicle collision avoidance control enable immediate and rapid control for avoiding vehicle collision when an area is suddenly congested while a vehicle is traveling at high velocity.

According to the embodiments of the present disclosure, an apparatus, system, and method for vehicle collision avoidance control can recognize information (e.g., blinking of hazard lights of a preceding vehicle) which accurately indicates a probability that movement of the preceding vehicle will be suddenly changed despite no change or a subtle change in the movement and can use the information for vehicle collision avoidance control.

The above embodiments of the present disclosure have been described only for illustrative purposes, and those of ordinary skill in the art will appreciate that various modifications and changes may be made thereto without departing from the essential features of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. An apparatus for vehicle collision avoidance control comprising a processor configured to:
    determine whether a velocity of the vehicle is a control-involved velocity or higher, recognize blinking of the hazard lights of the preceding vehicle in front of the vehicle when the velocity of the vehicle is determined to be the control-involved velocity or higher, and perform one or more of driver warning and deceleration control when blinking of the hazard lights of the preceding vehicle is recognized, wherein, if the blinking of the hazard lights is recognized, the processor determines the preceding vehicle blinking the hazard lights as a control target, determines whether the vehicle is currently in danger of collision with the control target preceding vehicle on the basis of a point in time when blinking of the hazard lights of the preceding vehicle is recognized, performs deceleration control if it is determined that the vehicle is currently in danger of collision with the preceding vehicle, and if blinking of the hazard lights of the preceding vehicle is recognized and then stopped, maintains the preceding vehicle as the control target and performs deceleration control.

2. The apparatus of claim 1, wherein at the point in time when blinking of the hazard lights of the preceding vehicle is recognized, the preceding vehicle is traveling at a certain velocity or lower or has stopped in a lane in which the vehicle is traveling or an adjacent lane of the lane.

3. The apparatus of claim 1, wherein the processor, when blinking of the hazard lights of the preceding vehicle is recognized, performs the driver warning for notifying a current situation, which includes blinking of the hazard lights of the preceding vehicle, a congested area in front of the vehicle, or the probability of vehicle collision, to a driver.

4. The apparatus of claim 3, wherein when a braking amount of the vehicle is currently smaller than a threshold value, the processor determines that the vehicle is currently in danger of collision with the preceding vehicle.

5. The apparatus of claim 1, wherein when blinking of the hazard lights of the preceding vehicle is recognized, processor issues a rear warning for notifying a front situation of the vehicle to a following vehicle of the vehicle.

6. The apparatus of claim 5, wherein the rear warning includes one or more of blinking of hazard lights of the vehicle, and output of an alarm sound.

7. The apparatus of claim 1, wherein the processor determines whether the blinking of the hazard lights of the preceding vehicle is continuously maintained since the blinking of the hazard lights of the preceding vehicle is recognized, and if the blinking of the hazard lights of the preceding vehicle is not maintained continuously, performs the deceleration control by maintaining the control target.

8. The apparatus of claim 1, wherein when blinking of the hazard lights of the preceding vehicle is not recognized, the processor performs deceleration control based on a time-to-collision with the preceding vehicle.

9. A system for vehicle collision avoidance control comprising:
a camera for acquiring front image of the vehicle; and
a processor configured to:
recognize when a velocity of the vehicle is a control-involved velocity or higher, blinking of hazard lights of a preceding vehicle based on the front image,
perform one or more of driver warning and deceleration control accordingly,
determine whether the velocity of the vehicle is the control-involved velocity or higher,
recognize blinking of the hazard lights of the preceding vehicle in front of the vehicle when the velocity of the vehicle is determined to be the control-involved velocity or higher,
determine, if the blinking of the hazard lights is recognized, the preceding vehicle blinking the hazard lights as a control target,
determine whether the vehicle is currently in danger of collision with the control target on the basis of a point in time when blinking of the hazard lights of the preceding vehicle is recognized,
perform deceleration control if it is determined that the vehicle is currently in danger of collision with the preceding vehicle, and
if blinking of the hazard lights of the preceding vehicle is recognized and then stopped, maintain the preceding vehicle as the control target and preforms deceleration control.

10. The system of claim 9, wherein at the point in time when blinking of the hazard lights of the preceding vehicle is recognized, the preceding vehicle is traveling at a certain velocity or lower or has stopped in a lane in which the vehicle is traveling or an adjacent lane of the lane.

11. The system of claim 9, wherein the processor, when blinking of the hazard lights of the preceding vehicle is recognized, performs the driver warning for notifying a current situation, which includes blinking of the hazard lights of the preceding vehicle, a congested area in front of the vehicle, and the probability of vehicle collision, to a driver.

12. A method for vehicle collision avoidance control, the method comprising:
a first operation of determining whether a velocity of a vehicle is a control-involved velocity or higher;
a second operation of recognizing blinking of hazard lights of a preceding vehicle in front of the vehicle when the velocity of the vehicle is determined to be the control-involved velocity or higher; and
a third operation of performing one or more of driver warning and deceleration control when the blinking of the hazard lights of the preceding vehicle is recognized,
wherein the third operation comprising,
determining, when the blinking of the hazard lights is recognized, the preceding vehicle blinking the hazard lights as a control target,
determining whether the vehicle is currently in danger of collision with the control target on the basis of a point in time when the blinking of the hazard lights of the preceding vehicle is recognized,
performing deceleration control when determined that the vehicle is currently in danger of collision with the preceding vehicle, and
when the blinking of the hazard lights of the preceding vehicle is recognized and then stopped, maintaining the preceding vehicle as the control target and performing deceleration control.

13. The method of claim 12, wherein
in maintaining the preceding vehicle as the control target and performing deceleration control,
determining whether the blinking of the hazard lights of the preceding vehicle is continuously maintained since the blinking of the hazard lights of the preceding vehicle is recognized, and
when the blinking of the hazard lights of the preceding vehicle is not maintained continuously, performing the deceleration control by maintaining the control target.

14. The method of claim 12, wherein the third operation includes issuing a rear warning for notifying a front situation of the vehicle to a following vehicle of the vehicle.

15. The method of claim 12, wherein at the point in time when blinking of the hazard lights of the preceding vehicle is recognized, the preceding vehicle is traveling at a certain velocity or lower or has stopped in a lane in which the vehicle is traveling or an adjacent lane of the lane.

\* \* \* \* \*